United States Patent [19]

Vianco et al.

[11] Patent Number: 5,547,484

[45] Date of Patent: Aug. 20, 1996

[54] METHODS OF MAKING METALLIC GLASS FOIL LAMINATE COMPOSITES

[75] Inventors: Paul T. Vianco; Robert W. Fisher; Floyd M. Hosking, all of Albuquerque; Frank J. Zanner, Sandia Park, all of N.M.

[73] Assignee: Sandia Corporation, Albuquerque, N.M.

[21] Appl. No.: 210,791

[22] Filed: Mar. 18, 1994

[51] Int. Cl.[6] .................................................. C03C 29/00
[52] U.S. Cl. .................. 65/42; 65/45; 65/51; 65/59.3; 65/59.34; 156/172; 148/528; 148/537; 427/435; 427/436; 427/431; 427/434.2
[58] Field of Search ................................. 65/59.1, 59.3, 65/59.34, 59.35, 42, 43, 45, 51, 66, 146, 150, 152, 154; 156/89, 172, 325; 148/528, 537; 427/430.1, 431, 433, 434.2, 435, 436

[56] References Cited

U.S. PATENT DOCUMENTS

| | | | |
|---|---|---|---|
| 4,113,684 | 9/1978 | Petrie | 260/29.2 |
| 4,163,821 | 8/1979 | Nienart et al. | 428/245 |
| 4,364,731 | 12/1982 | Norling et al. | 433/218 |
| 4,491,622 | 1/1985 | Butt | 428/632 |
| 4,652,347 | 3/1987 | Kobayashi | 204/34 |
| 4,746,055 | 5/1988 | Ingram et al. | 228/122 |
| 4,749,625 | 6/1988 | Obayashi et al. | 428/624 |
| 4,816,949 | 3/1989 | Yamada et al. | 360/120 |
| 5,045,637 | 9/1991 | Sato et al. | 174/35 M S |

FOREIGN PATENT DOCUMENTS 61-222675  10/1986  Japan .

OTHER PUBLICATIONS

Polk, D. E. and Giessen, B. C., "Overview of Principles and Applications," Chapter 1, *Metallic Glasses,* American Society For Metals, pp. 1–35, (1978).

Leng, Y. and Courtney, T. H., "Some tension properties of metal–metallic glass laminates," *Journal of Material Science,* vol. 24, pp. 2006–2010, (1989).

Leng, Y. and Courtney, T. H., "Fracture Behavior of Laminated Metal–Metallic Glass Composites," *Metallurgical transactions A,* vol. 21A, pp. 2159–2168, (1990).

Smith, C. H., "Magnetic Shielding to Multi–Gigawatt Magnetic Switches Ten Years of Amorphous Magnetic Applications," IEEE Transactions On Magnetics, vol. MAG–18, No. 6, pp. 1376–1381, (Nov. 1982).

*Primary Examiner*—Donald E. Czaja
*Assistant Examiner*—Sean Vincent
*Attorney, Agent, or Firm*—Timothy D. Stanley

[57] ABSTRACT

A process for the fabrication of a rapidly solidified foil laminate composite. An amorphous metallic glass foil is flux treated and coated with solder. Before solidification of the solder the foil is collected on a take-up spool which forms the composite into a solid annular configuration. The resulting composite exhibits high strength, resiliency and favorable magnetic and electrical properties associated with amorphous materials. The composite also exhibits bonding strength between the foil layers which significantly exceeds the bulk strength of the solder alone.

11 Claims, 3 Drawing Sheets

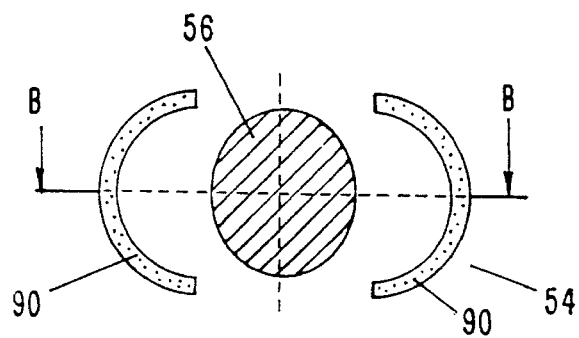
FIG-2A
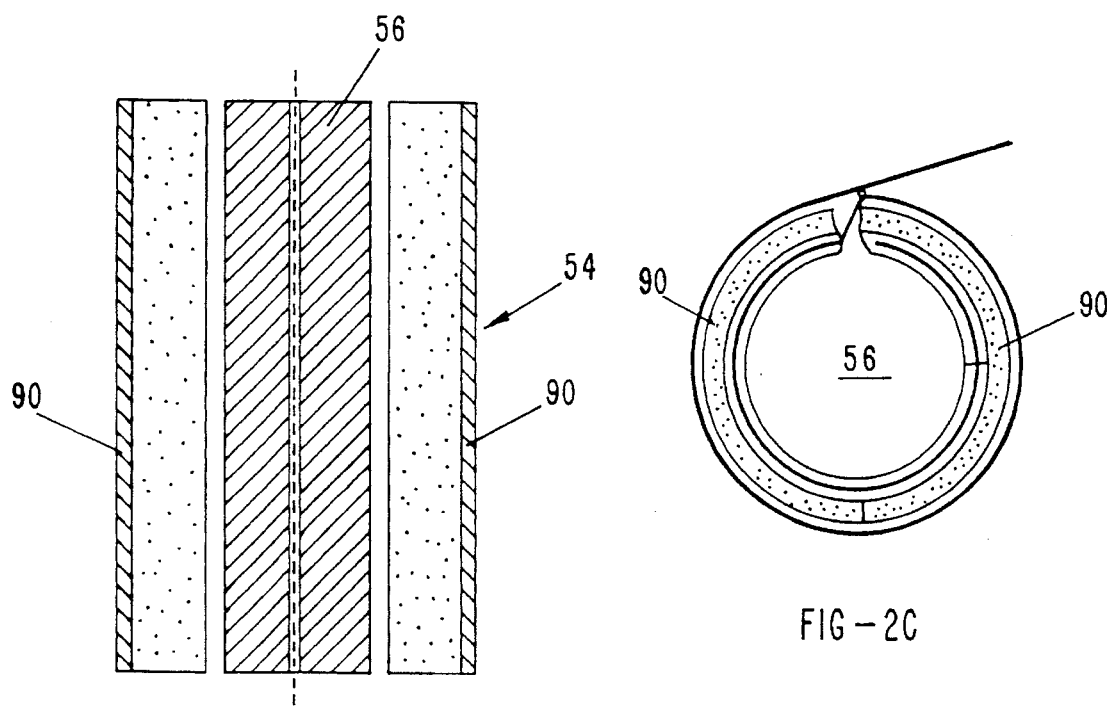
FIG-2B
FIG-2C

METHODS OF MAKING METALLIC GLASS FOIL LAMINATE COMPOSITES

The United States Government has rights in this invention pursuant to Contract No. DE-AC04-76DP00789 between the Department of Energy and American Telephone and Telegraph Company.

BACKGROUND OF THE INVENTION

This invention relates to the field of composite material manufacturing. More specifically, this invention relates to the field of amorphous metal-composite manufacturing and laminate construction techniques.

Description of Prior Art

Significant effort has been put forth in the area of materials engineering to produce composites or hybrids of two or more materials which results in a customization of desired properties and, on occasion, elimination of, or compensation for, undesirable properties.

In composite manufacturing, materials and specific atomic structures are chosen for their desirable properties. For example, large single crystals are grown for use in jet engine turbine blades, where strain resistance at very high temperatures is needed. Conversely, conductive non-crystalline amorphous materials are well suited for applications where preferred orientations of crystallographic atomic lattices are disadvantageous. Such applications include alternating current transformer windings, where soft magnetic amorphous conductors would improve efficiency with high magnetic saturation and reduced eddy current losses. Other applications for amorphous bulk structures include the manufacturing of hard or permanent magnets for motors which would significantly reduce their size.

Problems arise when the needed structure cannot be easily produced in a form compatible with the desired application. Amorphous materials are typically produced by rapid solidification of a molten material, which prohibits or impedes the growth or nucleation of crystals within the solidifying mass. The cooling rates necessary to trap the amorphous state are generally so high, that only a thin film or foil can be manufactured in the crystalline-free configuration. Availability of the amorphous material in only a foil-like configuration significantly limits utilization of advantageous properties.

A significant technological advantage can be achieved if the rapidly solidified amorphous composite could be produced in bulk to allow for the manufacturing of three-dimensional parts. It has been discovered that a rapidly solidified amorphous foil can be wound into a laminate composite using a variety of solder materials to produce a bulk structure sharing the advantageous properties of the amorphous foil.

The U.S. Pat. No. 4,163,821 to Nienart et al (1979) discloses a process for bonding layers of metallic glass ribbon using a curable liquid adhesive. The resulting composite exhibits a high quality appearance and surface texture, high flexibility and resistance to fraying. The disclosure teaches the utilization of metallic glass as a fabric and does not provide a process for fabrication of a composite in bulk.

Other patents relating to polymer adhesives include the U.S. Pat. No. 4,113,684 to Petrie (1978) and U.S. Pat. No. 4,364,731 to Norling et al (1982). Petrie provides a bonding technique for metals or glasses using a polymer adhesive that can be cold molded or heated to a viscous state for adhesion. In this disclosure, no rolling process nor bulk structure capability is claimed.

Norling et al discloses a method of enhancing polymer-to-substrate bonds via silane coupling agents. Although this disclosure addresses the use of a low melting temperature ceramic, it differs from the subject invention in that the ceramic is not used as the adhesive medium in the described process. Similar to the previously described disclosures, Norling has as its goal, effective adhesion rather than the manufacturing of bulk shapes.

U.S. Pat. No. 4,491,622 to Butt (1985) discloses a means for adhesion of two substrate metals or alloys through thin refractory oxide layers such that thermal stresses between the substrates, due to different coefficients of thermal expansion, are substantially eliminated. The disclosure is applicable to solving problems with printed wiring boards and chip carriers that exhibit substantial differences in coefficients of thermal expansion. Solder bonding and bulk formations are not addressed.

The present invention overcomes the deficiencies of the prior art by providing a solder bonded laminate bulk, of a rapidly solidified amorphous metallic glass foil and a method and apparatus for making same, which extends the advantageous properties of the thin foil to three dimensional shapes and objects. The subject inventive process and composite laminate goes beyond providing an adhesive or encapsulating medium and teaches a means to fabricate an amorphous material with advantageous physical, magnetic and conductive properties.

SUMMARY OF THE INVENTION

The present invention relates to a process for the fabrication of a laminate composite material comprised of rapidly solidified amorphous foil layers which are held together with a thin layer of solder. The composite material is manufactured by winding a coil of metallic glass ribbon in a bath of molten solder. The solder film joins the layers of metallic glass creating a bulk of the material that exhibits advantageous amorphous properties previously attainable only in very thin rapidly solidified foils. Availability of the material in bulk allows for the electric discharge machining of small three-dimensional laminate structures.

The resulting composite laminate material is useful in applications requiring wear resilience mechanical behavior such as bearings. It also has electronic applications where amorphous structure is needed to reduce domain switching energy loss, eddy current build up, and heat generation in alternating current applications. Other applications for the amorphous structure generated by rapid solidification include the manufacturing of improved permanent magnets.

An object of the invention is to provide a laminate composite with the mechanical, physical and electrical properties of amorphous structure that can be produced in bulk for three dimensional shapes and applications.

A further object of the invention is to provide an amorphous laminate composite having metallic or non-metallic binding material.

A still further object of the invention is to provide a process to manufacture an amorphous composite laminate.

A still further object of the invention is to provide a process for the manufacture of an amorphous composite laminate that has the mechanical and electrical properties of its rapidly solidified metallic glass foil component.

A still further object of the invention is to provide a process for the manufacture of an amorphous composite laminate in a bulk form that is useful in the machining of three dimensional structures which have the advantageous properties of a rapidly solidified metallic glass foil.

A still further object of the invention is to provide an apparatus for the manufacture of a composite formed from the lamination of metallic glass foil with a solder binding material.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a method for manufacturing a bulk composite material from an amorphous metal foil comprising: (A) applying molten solder to the surfaces of said foil, and (B) laminating a plurality of segments of said solder covered foil so as to form a layered bulk composite. The present invention may further comprise an apparatus for manufacturing a bulk composite laminate from a foil ribbon comprising: (A) means for feeding a foil ribbon; (B) means for coating said ribbon with a molten solder; and (C) means for collecting said solder coated ribbon comprising a collecting spool and means for rotating said collecting spool. The present invention may further comprise a bulk composite material comprising laminated amorphous metal foil bound by solder.

BRIEF DESCRIPTION OF THE DRAWINGS

The accompanying drawings, which are incorporated in and form part of the specification, further illustrate the present invention and, together with the description, serve to explain the principles of the invention.

FIG. 2A is an exploded diagrammatic representation in elevation of the take-up spool of FIG. 1 useful in collecting the solder-laden metallic glass foil.

FIG. 2B is a detail view in plan along B—B of FIG. 2A.

FIG. 2C is a diagrammatic representation in elevation of the take-up spool of FIG. 1 showing the inserted metallic glass foil ribbon.

DETAILED DESCRIPTION OF THE INVENTION

The present invention provides a method for the fabrication of bulk structures from rapidly solidified metallic glass. The desirable amorphous structure of metallic glass is only attainable where the metallic glass is solidified from the liquid state at a very high cooling rate. In order to achieve cooling rates of the order of $10^{6°}$ C./min, which are required to prevent crystallization of the material, metallic glasses are presently fabricated by ejecting molten metal onto a rapidly spinning wheel. The metallic glass solidifies as a thin foil typically less than 0.001 in. thick. The thin sectional configuration of the amorphous metallic glass foil, presently available, limits the availability of bulk geometries which would greatly expand the engineering applications of the metallic foil.

It has been discovered that amorphous metallic glass ribbons exhibit structural stability and maintain their amorphous phase upon exposure to the normal working temperatures of commercially available solders. As a result, a novel technique has been developed to fabricate a metallic glass/solder laminate composite in which a thin film of solder binds layers of metallic glass ribbon.

Figure 1:
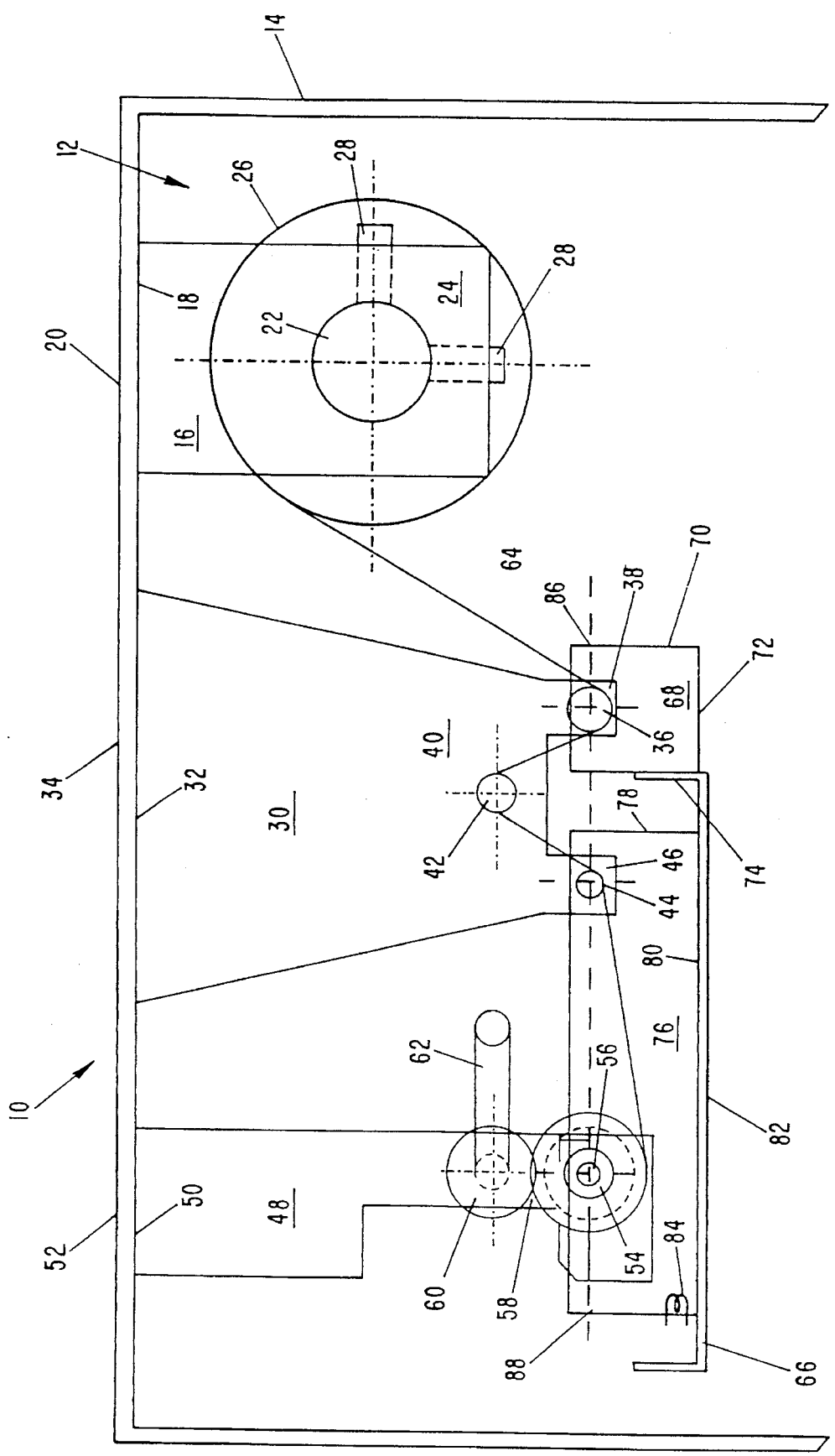
FIG. 1 is a diagrammatic representation in elevation of a winding apparatus useful in producing the annular solid composite specimen of the present invention.

Referring to FIG. 1, there is shown a diagrammatic cutaway view in elevation of the inventive apparatus useful in forming a novel coil composite of the present invention. Coil forming apparatus 10 includes winding unit 12 having suspension frame 14. Feed spool bracket 16 is attached at its upper end 18 to suspension frame 14 at a first suspension location "20". Feed spool axle 22 is mounted for rotation by means of bearings (not shown) on a lower portion 24 of feed spool bracket 16 and supports feed spool 26 for rotation therewith. Tensioners 28 of known construction are mounted on feed spool bracket 16 and act on feed spool axle 22 to hinder rotation of feed spool 26. Idler bracket 30 is attached at idler bracket upper end 32 to suspension frame 14 at a central suspension location 34. First idler pulley 36 is mounted for rotation on first idler tab 38. Idler tab 38 extends downward from lower portion 40 of idler bracket 30 on the portion thereof next adjacent feed spool 26. Second idler pulley 42 is centrally mounted for rotation on lower portion 40 of idler bracket 30 and above first idler pulley 36. Third idler pulley 44 is mounted for rotation on second idler tab 46 extending downward from lower portion 40 of idler bracket 30 and on the portion thereof remote from feed spool 26 and at a height equal to that of first idler pulley 36. Coil forming spool bracket 48 is attached at its upper end 50 to a third suspension location 52 on suspension frame 14 and in line with suspension feed spool bracket 16 and idler bracket 30. Coil forming spool 54 is mounted on rotating forming spool axle 56, which is supported by lower portion 58 of forming spool bracket 48 at a height equal to that of first idler pulley 36 and second idler pulley 42. Coil forming spool 54 is driven for rotation by ceramic gears (not shown) from driving wheel 60 mounted for rotation on forming spool bracket 48 and is actuated for rotation by hand crank 62 attached thereto. Metallic glass foil ribbon 64 is positioned on winding unit 12 so as to feed from feeding spool 26 to coil forming spool 54 for collection thereon by routing below first idler pulley 36, then above second idler pulley 42 and then below third idler pulley 44. Feed spool 26, idler pulleys 36, 42, and 44, and coil forming spool 54 are each located in the same vertical plane to facilitate the movement of foil ribbon through winding unit 12.

Coil forming apparatus 10 includes vat frame 66 located for relative motion with suspension frame winding unit 12. Flux vat 68 is mounted on vat frame 66 at first vat frame location 74 at an end thereof next adjacent feed spool 26 of winding unit 12. Solder vat 76 is mounted on vat frame 66 at second vat frame location 82, remote from feed spool 26 and winding unit 12. Heater 84 is located in solder vat base 80. Flux vat 68 is filled with an appropriate liquid flux to flux level 86 on side-wall 70. Solder vat 76 is filled with an appropriate liquid solder to solder level 88 on sidewall 78. Levels 86 and 88 are preferably equal.

Referring to FIG. 2A and 2B, and 2C there are shown exploded details of coil forming spool 54, and the attachment of foil ribbon 64 thereto, respectively. Forming spool 54 is made up of graphite half-cylinder retainers 90 which conform to the circumferential surface of rotating forming spool axle 56. Foil ribbon 64 is retained by forming spool 54 by compression between half-cylinder retainers 90 and rotating forming spool axle 56, the foil ribbon being threaded between the retainers to the outer circumference thereof to begin the coil forming process.

Figure 3A:
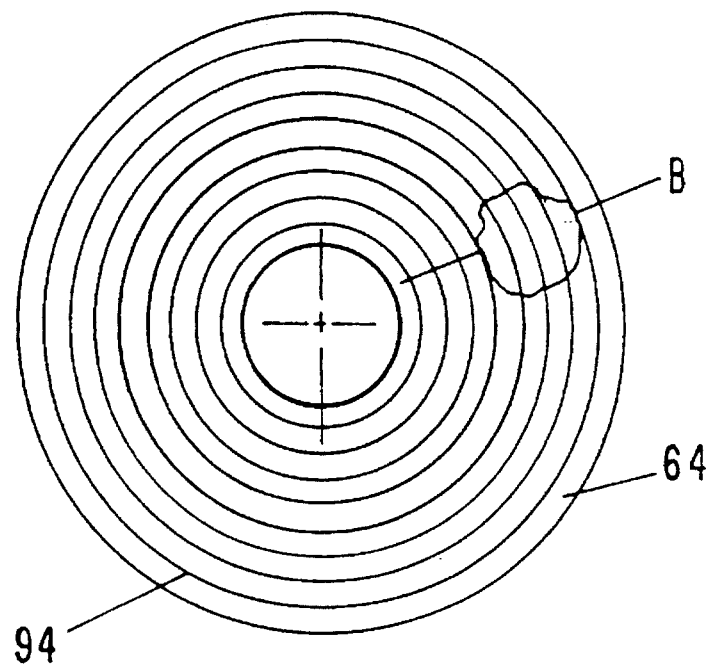
FIG. 3A is a diagrammatic representation of the manufactured annular composite laminate of the present invention.
Figure 3B:
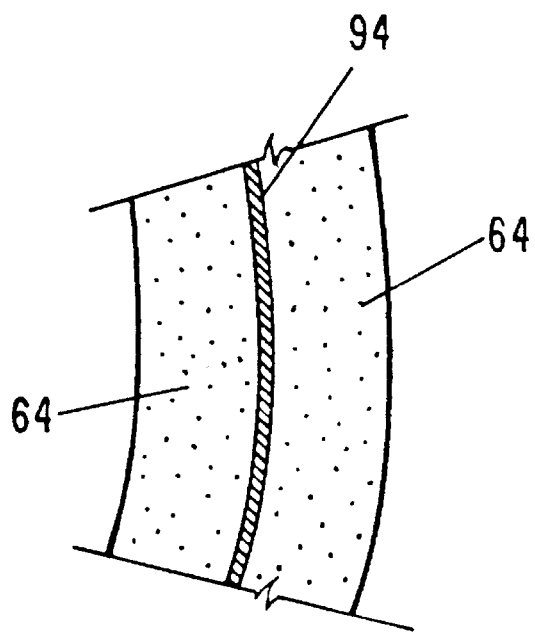
FIG. 3B is a magnified detail of FIG. 3A at B.

FIG. 3A is a diagrammatic end view of the composite product coil 92 of the present invention showing alternating layers of foil ribbon 64 and solder 94. FIG. 3B is a magnified detail of the construction of composite product coil 92 of the present invention showing alternating layers of foil ribbon 64 and solder 94.

In operation, solder heater 84 is activated, liquefying the solder in solder vat 76. A feed spool 26 of metallic glass foil ribbon 64 is placed on feed spool axle 22 and the free end of foil ribbon 64 threaded under first idler pulley 36, then over second idler pulley 42, and then under third idler pulley 44, as feed spool 26 rotates with axle 22 and foil ribbon 64 unwinds therefrom. The free end of foil ribbon 64 is then fed over forming spool axle 56 and secured thereto by placement of half-cylinder retainers 90 to form coil forming spool 54 (See FIG. 2A and 2B). The flux vat 68 and solder vat 76 are raised to a level such that the first idler pulley 36 is at least partially immersed in the liquid flux in flux vat 68, and third idler pulley 44 and coil forming spool 54 are each at least partially immersed in liquid solder in solder vat 76. Second idler pulley 42 remains above the liquid levels 86 and 88. As a result, a first portion of foil ribbon 64 is immersed in liquid flux in flux vat 68. A second portion of foil ribbon 64 remote from feed spool 26 relative to the first portion is simultaneously immersed in liquid solder wherein the free end is attached to coil forming spool 54. Preferably, the respective centers of rotation of first idler pulley 36 and third idler pulley 44 and coil forming spool 54 are located at flux level 86 and solder level 88, respectively. To form a product composite coil 92, hand crank 62 is turned, which drives driving wheel 60 and, in turn, rotates coil forming spool axle 56 and, thus, coil forming spool 54. As coil forming spool 54 turns, foil ribbon 64 is drawn from feed spool 26, under first idler pulley 36 and, thereby, through flux vat 68, over second idler pulley 42, and under third idler pulley 44 and, thus, into solder vat 76 where it is collected on coil forming spool 54. Tensioners 28 act on feed spool axle 22 to maintain desired tension on foil ribbon 64, thus, maintaining a uniform thickness of solder retained between the layers of foil ribbon as the composite coil product 92 is formed. Upon obtaining the desired size of composite coil product, the vats 68 and 76 are lowered, and the composite product coil is allowed to cool and is removed from 10 from spool 54.

In the inventive process, the metallic glass ribbons presently available are nominally one inch wide and one one-thousandth inch thick. Metallic glass compositions used in the prototype coils to ascertain flexibility of the process were Metglas™ 2605S-2 (92 wt. % Fe-3 wt. % B-5 wt. % Si), 2705M (81 wt. % Co-4 wt. % Fe-1 wt. % Ni-4 wt. % Mo-3 wt. % B-7 wt. % Si), and 2714A (82 wt. % Co-5 wt. % Fe-1 wt. % Ni-3 wt. % B-9 wt. % Si) commercially available from Allied Signal Corporation's Amorphous Metals Division in Parsipany, N.J. Other metallic glass compositions may also be adaptable to this process depending on the particular properties desired. The ribbons are unraveled from one kilogram shipping spools. No treatment is performed on the ribbon surfaces.

A variety of solders are useful in the inventive process and can be chosen to optimize the end product laminate. For example, solder alloys having compositions of 95 wt. % Sn-5 wt. % Sb, 81 wt. % Pb-19 wt. % In, and the alloy 79.2 wt. % Pb-17.4 wt. % In-3.4 wt. % Sn are known to be useful in the practice of this invention. The working temperatures of these solders are 330° C. to 300° C., 370° C., to 300° C. and 330° C. to 270° C. respectively. Solders containing Ag exhibit poor adhesion between the foils layers. Although solders containing Sb exhibit a degree of embrittlement, the resulting composites remain useful for some applications. Embrittlement is eliminated in the Pb-In solder; however, wettability is not as high as that of the tin-based solders. Wettability of the solder can be improved significantly by the addition of 5–10 wt. % Sn without embrittlement nor a deleterious reduction in the solidus temperature. The working temperatures of these solders are low enough so as not to cause crystallization of the amorphous structure. A liquid flux useful in the invention is the commercially available Alpha 200L.

The coiling process solder bond thicknesses of the inventive composite are about 2–5 μm (0.00008–0.00020 in.). A typically observed bond thickness of 2.5 in. (0.0001), resulted in an overall laminate composition of 90% metallic glass/10% solder. A winding of 675 turns produces a coil approximately 51 mm (2.000 in.) in outer diameter. The inner diameter of this annular product is 14 mm (0.551 in.) which is dictated by the outside diameter of the collecting spool on the apparatus. This experimental configuration produced an annular sample of the composite laminate with an included thickness of 17 mm (0.724"). Wire electric discharge machining is useful in cutting bulk shapes from the laminate composite.

The present invention is further illustrated by the following example.

EXAMPLE

Test coils were prepared employing the inventive apparatus and processes described above and shown in the Figures. The winding system of the present invention was operated under about 2 lb of tension. The Table I, below, describes representative test parameters:

TABLE I

| | Composite Coil Test Parameters | | | | |
|---|---|---|---|---|---|
| Coil No. | Metglas Alloy | Solder Alloy | Turns (No.) | $T_i$ (°C.) | $T_f$ (°C.) |
| 1 | 2714A | 96.5Sn-3.5Ag | <100 | 280 | 240 |
| 2 | 2705M | 95Sn-5Sb | 135 | 330 | 289 |
| 3 | 2705M | 95Sn-5Sb | 675 | 316 | 265 |
| 4 | 2605-S | 81Pb-19In | 250 | 348 | 305 |
| 5 | 2705M | 79.2Pb-17.4In-3.4Sn | 624 | 334 | 285 |
| 6 | 2705M | 72.9Pb-15.2In-11.9Sn | 700 | 327 | 270 |

Where Turns No. is the total number of turns in the coil sample; $T_i$ is the initial solder bath temperature; and $T_f$ is the final solder bath temperature at the completion of the winding operation.

The flux employed in the above tests is Alpha 200L Flux. The dimensions of the Metglas tape employed are 1 in.× 0.001 in.

The Ag-containing solders demonstrated poor adhesion and, thus, are not useful in the invention. The Sb-containing solders resulted in a degree of embrittlement, but the resulting composites remain useful for some applications. The Pb-In solder composite exhibited less embrittlement, but has reduced wettability with the Metglas ribbon. The Pb-In-Sn solders resulted in a tough composite having the desirable physical properties of the Metglas constituent.

The grindability of the composite coil was demonstrated in test coil no. 2, where the coil was subjected to a grinding operation, which demonstrated that the composite could be machined into desired shapes by grinding while maintaining its physical integrity.

The machinability of the novel composites was further demonstrated by slicing the test coils no. 3, 5, and 6, respectively, into 0.060 in. thick annular disks employing wire electrical discharge machining. Circular disks were cut from the resulting annular sections. The composites maintained their physical integrity throughout the machining steps resulting in machined parts of comparable physical properties to that of the test coil and the original Metglas.

The composite laminates of the present invention exhibit extremely high strength which is maintained during electric discharge machining processing. The high strength of the composite (which includes the relatively low strength solder) is attributed primarily to the high strength and ductility of the metallic glass and the very thin solder bond. The mechanical constraint of thin gaps causes a joint to have an apparent strength which far exceeds that of the bulk bonding material which fills the gap (i.e. the solder). The appropriate joint thickness is obtained by control of the tension induced by the tensioners of the winding apparatus described above. A tension of about two lbs is useful in the practice of the present invention.

The assembly technique of the present invention allows for the fabrication of a gap thickness which is one or two orders of magnitude smaller than that of conventional solder joints used in either electronic or structural applications. The resulting properties allow the use of metallic glasses as a composite in many load-bearing structural applications as well as applications in which wear resistance is required.

In an electronics application, the amorphous structure of the metallic glass is responsible for several favorable properties. Some metallic glasses have been found to have excellent soft magnetic properties useful in transformer core applications. The absence of a preferred orientation within the metallic glass significantly reduces energy losses caused by domain switching, associated with alternating current environments. Amorphous materials are also less susceptible to eddy current build up due to their higher resistivities as opposed to conventional transformer core steels. For any specific power or current state, they will also generate less heat, and when subjected to a magnetic field, are less prone to internally generate a magnetic field in opposition to the one induced. The inventive composite also has applications in magnetic shielding structures, low frequency magnetic field applications and permanent magnets in motors by changing to an iron-rare earth hard magnetic amorphous ribbon.

The present invention also contemplates the use of a low melting temperature solder-glass ceramic as the binding material as an alternative to the conductive alloy solders described above. The use of non-metallic solders in the inventive process broadens the applications where the inventive composite may be put to use. One such solder-glass, is composed of, in weight percent on an elemental basis, 20–85% Sn, 2–20% P, 3–20% O and 10–36% F, the Sn+P+O+F total being at least 75%.

The insulating nature of such solder-glass ceramics provides a configuration of the composite wherein a spiral conductive material is formed which is useful as the windings element in transformer manufacturing. When using such solder-glass ceramics, no flux or fluxing apparatus such as element 68 of FIG. 1 is needed since the solder-glass ceramic is known to adhere directly to the metallic glass foil. Applications for the composite materials, produced by the inventive process, include use as a bulk material for bearings, or bearing surfaces, a low cost structural material a composite laminate for use in low frequency alternating current components, and as a material for permanent magnets in generators and electric motors.

The particular composites, processes and apparatus discussed above are cited merely to illustrate a particular embodiment of this invention. It is contemplated that the practice of the invention may involve additional composites, process steps and apparatus as long as the principle, the use of a solder winding process with amorphous metallic foil to form a laminate useful for manufacturing composite bulk structures, is followed.

We claim:

1. A method for manufacturing a bulk composite material from an amorphous metal foil comprising:
   a) immersing said foil in molten solder and forming a solder covered foil while said foil is under tension; and
   b) laminating a plurality of segments of said solder covered foil so as to form a layered bulk composite while said segments of solder covered foil are under tension.

2. The method of claim 1 wherein said foil is disposed in the form of a ribbon and the solder covered foil ribbon is laminated by winding under tension to form a coiled bulk composite laminate.

3. The method of claim 2, wherein the foil ribbon material is an amorphous metallic glass selected from the group consisting of: METGLAS™ 2605S-2, METGLAS™ 2705M, and METGLAS™ 2714A.

4. The method of claim 3, further comprising the step of contacting the foil ribbon with a cleaning flux and wherein the solder is a metallic solder alloy.

5. The method of claim 4 wherein said solder alloy is selected from the group comprising an alloy having a composition of 95 wt. % Sn-5 wt. % Sb, an alloy having a composition of 81 wt. % Pb-19 wt. % In, and an alloy having a composition of 79.2 wt. % Pb-17.4 wt. % In-3.4 wt. % Sn.

6. The method of claim 3, wherein the solder is a solder-glass.

7. The method of claim 6 wherein the solder-glass is a tin-phosphorus-oxyflouride solder-glass having a composition in the range of from 20 to 85 wt. % Sn, from 2 to 20 wt. % P, from 3 to 20 wt. % O and from 10 to 36 wt. % F on an elemental basis, the total weight of Sn,P,O, and F being at least 75 wt. % of the total solder-glass composition.

8. The method of claim 2 wherein said foil ribbon is about 0.001 inch in thickness.

9. The method of claim 8 wherein the tension applied is sufficient to result in a solder thickness between the coils of the product laminate of about 0.0001 inch.

10. A method for manufacturing a bulk composite material from an amorphous metal foil comprising:
    a) immersing said foil in molten solder and applying a coating of molten solder to the surfaces of said foil, and
    b) laminating a plurality of segments of said solder covered foil so as to form a layered bulk composite.

11. The method of claim 10, wherein said foil is immersed while under tension and said segments of solder covered foil are laminated while under tension.

* * * * *